United States Patent
Lee et al.

(10) Patent No.: US 10,031,676 B2
(45) Date of Patent: Jul. 24, 2018

(54) MEMORY CONTROLLER, AND MEMORY MODULE AND PROCESSOR INCLUDING THE SAME

(71) Applicants: MemRay Corporation, Seoul (KR); YONSEI UNIVERSITY, UNIVERSITY-INDUSTRY FOUNDATION (UIF), Seoul (KR)

(72) Inventors: Jaesoo Lee, Incheon (KR); Myoungsoo Jung, Incheon (KR); Gyuyoung Park, Incheon (KR)

(73) Assignees: MEMRAY CORPORATION, Seoul (KR); YONSEI UNIVERSITY, UNIVERSITY—INDUSTRY FOUNDATION (UIF), Seoul (KR)

( * ) Notice: Subject to any disclaimer, the term of this patent is extended or adjusted under 35 U.S.C. 154(b) by 142 days.

(21) Appl. No.: 15/208,903

(22) Filed: Jul. 13, 2016

(65) Prior Publication Data
US 2017/0351438 A1    Dec. 7, 2017

(30) Foreign Application Priority Data
Jun. 1, 2016    (KR) .................. 10-2016-0068402

(51) Int. Cl.
G06F 12/00    (2006.01)
G06F 3/06    (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,606,111 B2 | 10/2009 | Lee et al. | |
| 8,046,559 B2 | 10/2011 | Zheng et al. | |
| 9,104,531 B1 | 8/2015 | Shumsky | |
| 9,170,939 B1* | 10/2015 | Jones | G06F 12/0246 |
| 2011/0026318 A1* | 2/2011 | Franceschini | G06F 13/161 |
| | | | 365/163 |
| 2012/0124317 A1 | 5/2012 | Mirichigni et al. | |
| 2015/0242132 A1* | 8/2015 | Brooker | G06F 12/0806 |
| | | | 711/102 |
| 2017/0068456 A1* | 3/2017 | Toge | G06F 3/0605 |
| 2017/0123722 A1* | 5/2017 | Sela | G06F 3/0656 |

FOREIGN PATENT DOCUMENTS

KR    10-1182018    9/2012

OTHER PUBLICATIONS

Behazad Boroujerdian et al, "LPDDR2 Memory Controller Design in a 28nm Process", Conference Proceedings, Dec. 12, 2012.
Ulrich Drepper, "What Every Programmer Should Know About Memory", Red Hat, Inc., Nov. 21, 2007.

* cited by examiner

*Primary Examiner* — John A Lane
(74) *Attorney, Agent, or Firm* — Lex IP Meister, PLLC

(57) ABSTRACT

In a memory controller, a request handler processes a write request which is issued from a CPU and requests data write to a memory device using a phase change memory, and a request queue stores the write request. A scheduler returns a completion on the write request to the CPU when a predetermined write time has elapsed. The predetermined write time is shorter than a write latency time that is taken to complete the data write to a memory cell of the memory device in response to the write request.

16 Claims, 12 Drawing Sheets

MEMORY CONTROLLER, AND MEMORY MODULE AND PROCESSOR INCLUDING THE SAME

CROSS-REFERENCE TO RELATED APPLICATION

This application claims priority to and the benefit of Korean Patent Application No. 10-2016-0068402 filed in the Korean Intellectual Property Office on Jun. 1, 2016, the entire contents of which are incorporated herein by reference.

BACKGROUND

(a) Field

The described technology relates to a memory controller, and a memory module and processor including the same.

(b) Description of the Related Art

In response to memory devices characterized by high data storage capacity and low power consumption, new memory devices have been developed. These next generation memory devices include, for example, a phase change memory (PCM) that uses a phase change material to store data. A phase-change random access memory (PRAM) is a typical one of the PCMs. The PCM uses the phase change material that can be switched between a crystalline state and an amorphous state, and stores data based on a resistivity difference between the crystalline state and the amorphous state.

In the PCM, there is a problem that writing the data by changing the state of the phase change material needs a longer time than reading the data through the phase change material of the current state.

SUMMARY

An embodiment of the present invention provides a memory controller, and a memory module and processor including the same, for reducing a data write latency time experienced by a CPU.

According to another embodiment of the present invention, a memory controller including a request handler, a request queue, and a scheduler is provided. The request handler handles a write request which is issued from a central processing unit (CPU) and which requests data write to a memory device using a phase change memory. The request queue stores the write request. The scheduler returns a completion on the write request to the CPU when a predetermined write time has elapsed wherein the predetermined write time is shorter than a write latency time that is taken to complete the data write to a memory cell of the memory device in response to the write request.

The memory controller may further include a store buffer that temporally stores write data corresponding to the write request when the write data are written to the memory device. The request handler may, in response to a read request from the CPU, read data corresponding to the read request from the store buffer when the read data are stored in the store buffer.

The memory controller may further include a lookup memory that stores an address of data stored in the store buffer.

The store buffer may evict the write data after a predetermined time has elapsed.

The store buffer may evict an oldest data when a new write request is inserted.

The memory controller may further include an expiration queue that includes a plurality of first entries corresponding to a plurality of second entries of the store buffer respectively and moves a point when the write request is inserted. The store buffer may evict data of a second entry corresponding to a first entry indicated by the pointer from among the second entries.

The expiration queue may further move the pointer when a predetermined time is expired.

The request queue may include a write request queue that stores the write request. The request handler may, when a burst corresponding to the write request exists in the write request queue, add the write request to the burst, and when no burst corresponding to the write request exists in the write request queue, add a new burst including the write request to the write request queue.

The request queue may further include a read request queue that stores a read request which is issued from the CPU and requests a data read from the memory device. The request handler may, when a burst corresponding to the read request exists in the read request queue, add the read request to the burst, and when no burst corresponding to the read request exists in the read request queue, add a new burst including the read request to the read request queue.

The request queue may include a write request queue that stores the write request and a read request queue that stores a read request which is issued from the CPU and requests a data read from the memory device. The scheduler may create a command to be issued to the memory device based on a request stored in the write request queue when a predetermined latency time has elapsed from a previous write operation in the memory device.

The scheduler may create a command to be issued to the memory device based on a request stored in the read request queue when the predetermined latency time has not elapsed.

The predetermined latency time may be determined based on a time necessary for performing a write operation again in the memory device after the previous write operation.

The predetermined latency time may be determined based on a time necessary for charge pumping for a write operation in the memory device.

The predetermined latency time may be determined based on a time necessary for cooling in the memory device.

According to yet another embodiment of the present invention, a memory controller including a write request queue, a read request queue, and a scheduler is provided. A write request which request a data write to a memory device using a phase change memory from a CPU is added to the write request queue. A read request which request a data read from the memory device from the CPU is added to the read request queue. The scheduler creates a command to be issued to the memory device based on a request stored in the write request queue when a predetermined condition is satisfied, and creates a command to be issued to the memory device based on a request stored in the read request queue when the predetermined condition is not satisfied.

The predetermined condition may include a first condition that the write request queue is not empty and a second condition that a predetermined latency time has elapsed from a previous write operation in the memory device.

The predetermined latency time may be determined based on a time necessary for performing a write operation again in the memory device after the previous write operation.

According to still another embodiment of the present invention, a memory controller including a write request queue, a read request queue, a store buffer, and a request handler is provided. A write request which request a data write to a memory device using a phase change memory from a CPU is added to the write request queue. A read request which request a data read from the memory device from the CPU is added to the read request queue. The store buffer temporally stores write data corresponding to the write request. The request handler reads data corresponding to the read request and returns the data when the read request hits any entry in the store buffer.

The store buffer may evict the write data after a predetermined time has elapsed.

According to further embodiment of the present invention, a memory module including a memory controller according to any one of the above embodiments and the memory device is provided.

According to further embodiment of the present invention, a processor a memory controller according to any one of the above embodiments is provided. The processor is connected to the memory device through a system bus.

DETAILED DESCRIPTION OF THE EMBODIMENTS

Figure 1:
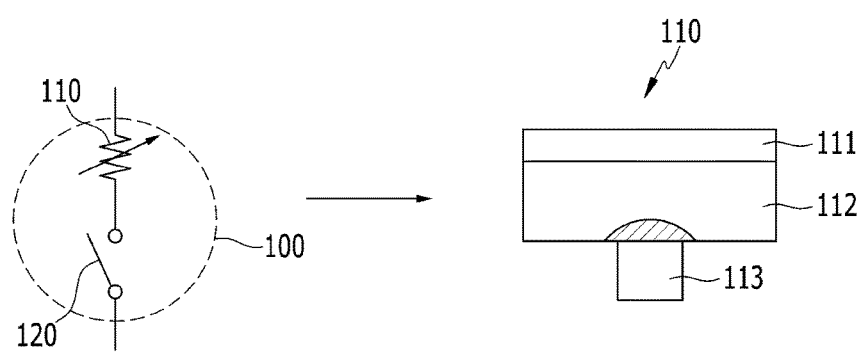
FIG. 1 schematically shows one memory cell in a PCM.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

While a PRAM is described as an example of a PCM in embodiments of the present invention, embodiments of the present invention are not limited to the PRAM and are applicable to various PCMs.

First, a data write time in the PRAM is described with reference to FIG. 1, FIG. 2, and FIG. 3.

Figure 2:
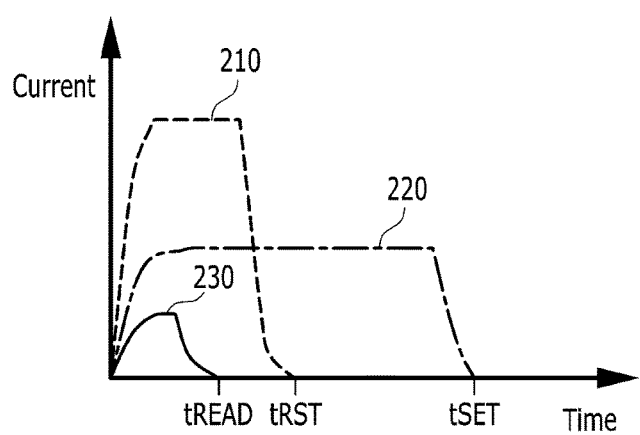
FIG. 2 shows a current applied to a memory cell shown in FIG. 1.
Figure 3:
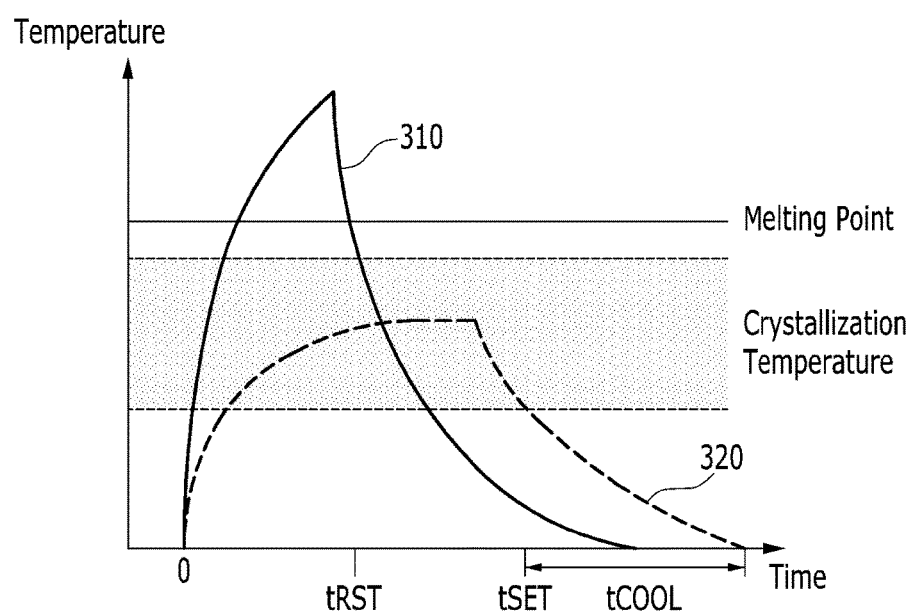
FIG. 3 shows a temperature change when a current shown in FIG. 2 is applied to a memory cell shown in FIG. 1.

FIG. 1 schematically shows one memory cell in a PCM, FIG. 2 shows a current applied to a memory cell shown in FIG. 1, and FIG. 3 shows a temperature change when a current shown in FIG. 2 is applied to a memory cell shown in FIG. 1.

The memory cell shown in FIG. 1 is an example memory cell, and a memory cell of the PCM according to embodiments of the present invention may be implemented in various forms.

Referring to FIG. 1, a memory cell 100 of a PRAM includes a phase change element 110 and a switching element 120. The switching element 120 may be implemented with various elements such as a transistor or a diode. The phase change element 110 includes a phase change layer 111, an upper electrode 112 formed above the phase change layer 111, and a lower electrode 113 formed below the phase change layer 111. For example, the phase change layer 110 may include an alloy of germanium (Ge), antimony (Sb) and tellurium (Te), which is referred to commonly as a GST alloy, as a phase change material.

The phase change material can be switched between an amorphous state with relatively high resistivity and a crystalline state with relatively low resistivity. A state of the phase change material may be determined by a heating temperature and a heating time.

Referring to FIG. 1 again, when a current is applied to the memory cell 100, the applied current flows through the lower electrode 113. When the current is applied to the memory cell 100 during a short time, a portion, of the phase change layer 111, adjacent to the lower electrode 113 is heated by the current. The cross-hatched portion of the phase change layer 111 is switched to one of the crystalline state and the amorphous state in accordance with the heating profile of the current. The crystalline state is called a set state and the amorphous state is called a reset state.

Referring to FIG. 2 and FIG. 3, the phase change layer 111 is programed to the reset state when a reset current 210 with a high current is applied to the memory cell 100 during a short time tRST. If a temperature 310 of the phase change material reaches a melting point as the phase change material of the phase change layer 111 is heated by the applied reset current 210, the phase change material is melted and then is switched to the amorphous state. The phase change layer 111 is programed to the set state when a set current 220 being lower than the reset current 210 is applied to the memory cell 100 during a time tSET being longer than the time tRST. If a temperature 330 of the phase change material reaches a crystallization temperature as the phase change material is heated by the applied set current 220, the phase change material is melted and then is transformed to the crystalline state. Since the reset state and the set state can be maintained when a current is applied with being lower than the set current 220 or with being shorter than the set current 220, data can be programmed to the memory cell 100.

The reset state and the set state may be set to data of "1" and "0," respectively, and the data may be sensed by measuring the resistivity of the phase change element 110 in the memory cell 100. Alternatively, the reset state and the set state may be set to data of "0" and "1," respectively.

Therefore, the data stored in the memory cell 100 can be read by applying a read current 230 to the memory cell 100. The read current 230 is applied with a low magnitude during a very short time tREAD such that the state of the memory cell 100 is not changed. The magnitude of the read current 230 may be lower than the magnitude of the set current 220, and the applied time of the read current 230 may be shorter than the applied time tRST of the reset current 210. Because the resistivity of the phase change element 110 in the memory cell 100 is different according to the state of the phase change element 110, the state of the phase change element 110, i.e., the data stored in the memory cell 100, can be read by a magnitude of a current flowing to the phase change element 110 or a voltage drop on the phase change element 110.

In one embodiment, the state of the memory cell 100 may be read by a voltage at the memory cell 100 when the read current 230 is applied. In this case, since the phase change element 110 of the memory cell 100 has a relatively high resistance in the reset state, the state may be determined to the reset state in a case that the voltage sensed at the phase change element 110 is relatively high and to the set state in a case that the voltage sensed at the phase change element 110 is relatively low. In another embodiment, the state of the memory cell 100 may be read by an output current when a voltage is applied to the memory cell 100. In this case, the state may be determined to the reset state in a case that the current sensed at the phase change element 110 is relatively low and to the set state in a case that the current sensed at the phase change element 110 is relatively high.

Generally, a plurality of memory cells 100 are arranged in a substantially matrix format to form a memory cell array, and data are simultaneously written to memory cells formed on a plurality of columns at the same row. Accordingly, the reset current 210 may be supplied to memory cells 100 to be switched to the reset state and then the set current 220 may be supplied to memory cells 100 to be switched to the set state, in order to write data to the memory cells 100 formed on the plurality of columns In this case, a program time tPGM for writing the data is a time (tRST+tSET) corresponding to a sum of an applied time tRST of the reset current 210 and an applied time tSET of the set current 220. Alternatively, when the reset current 210 and the set current 220 are simultaneously applied, the program time tPGM for writing the data is a time max(tRST,tSET) corresponding to a maximum value of the applied time tRST of the reset current 210 and the applied time tSET of the set current 220.

Further, a write driver may increase a voltage for supplying the reset current 210 and the set current 220 and store charges for the increased voltage, in order to apply the reset current 210 and the set current 220 to the memory cells 100. Accordingly, a time tCHG for charge pumping may be required before the reset current 210 or the set current 220 is applied to the memory cells 100.

Referring to FIG. 3 again, a cooling time may be further needed until the phase change material of the memory cell 100 is cooled after being heated. Data may not be successfully read when the data are read from the memory cell 100 before the phase change material is cooled. Accordingly, the cooling time tCOOL may be further required before reading the data.

Therefore, a write latency time tWRT taken for completing the data write may be given as in Equation 1. The write latency time tWRT may be a time that is required until a memory cell 100 becomes a state capable of reading/writing data after starting to program the data to the memory cell 100.

$$tWRT = tPGM + \max(tCHG, tCOOL) \qquad \text{Equation 1}$$

Figure 4:
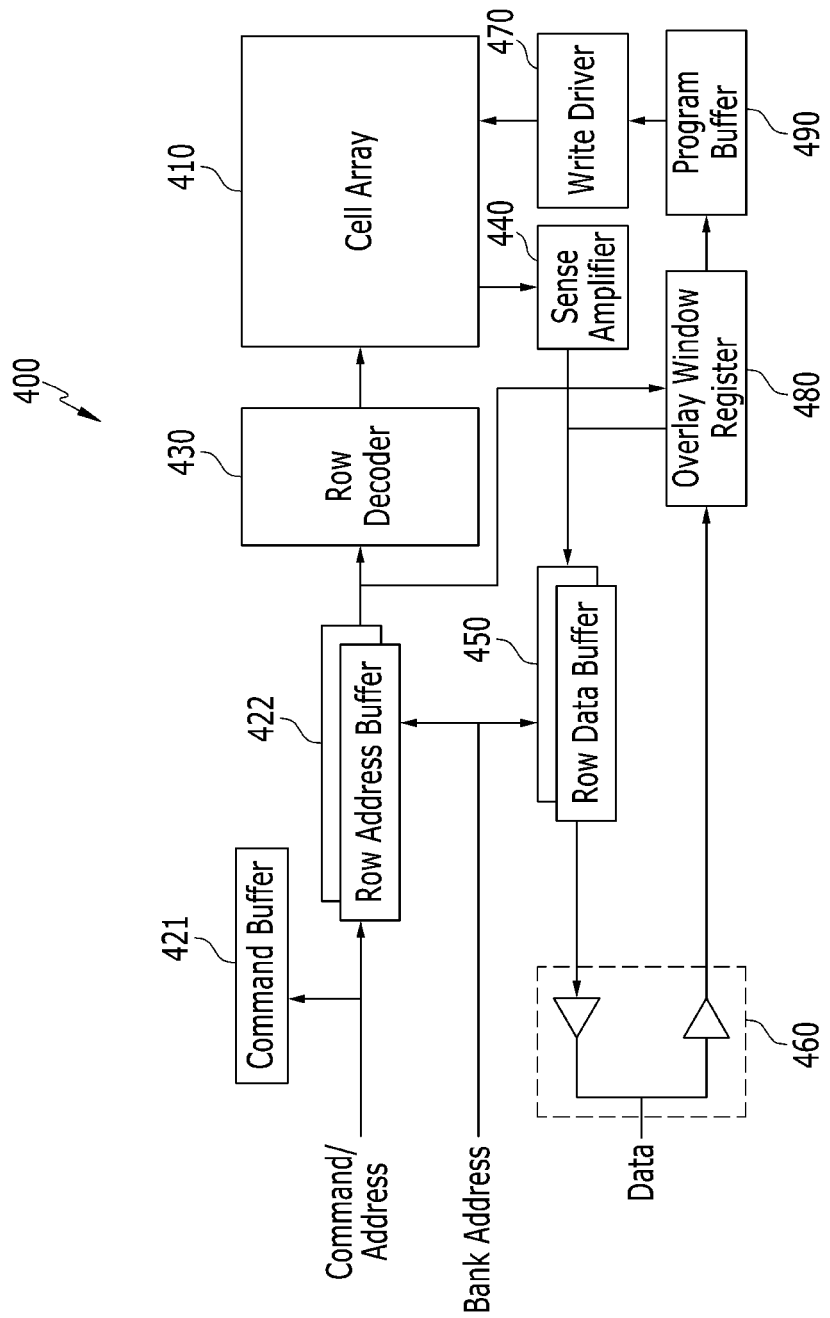
FIG. 4 is a schematic block diagram of a memory according to an embodiment of the present invention.

FIG. 4 is a schematic block diagram of a memory according to an embodiment of the present invention. A memory shown in FIG. 4 may be a memory chip or a memory bank.

Referring to FIG. 4, a memory 400 includes a memory cell array 410, a command buffer 421, a row address buffer 422, a row decoder 430, a sense amplifier 440, a row data buffer 450, a data input/output (I/O) unit 460, and a write driver 470.

The memory cell array 410 includes a plurality of word lines (not shown) extending substantially in a row direction, a plurality of bit lines (not shown) extending substantially in a column direction, and a plurality of memory cells (not shown) that are connected to the word lines and the bit lines and are formed in a substantially matrix format. The memory cell may be, for example, a memory cell 100 described with reference to FIG. 1. In some embodiments, the memory cell array 410 may be partitioned into a plurality of partitions.

The command buffer 421 and the row address buffer 422 store commands and addresses (particularly, row addresses) from a memory controller. In some embodiments, a plurality of row address buffers 422 may be provided. In one embodiment, a row address buffer 422 may be provided for each bank, and the memory controller may provide a bank address (for example, a buffer number) for addressing the row address buffer 422. In another embodiment, two or more row address buffers 422 may be provided for each bank, and each row address buffer 422 may be addressed by a bank address or a part of the bank address.

The row decoder 430 decodes a row address to select a word line for reading data or writing data from among the plurality of word lines of the memory cell array 410.

The sense amplifier 440 reads data stored in the memory cell array 410. The sense amplifier 440 may read the data, through a plurality of bit lines, from a plurality of memory cells connected to the word line selected by the row decoder 430. The row data buffer 450 stores the data read by the sense amplifier 440. In some embodiments, a plurality of row data buffers 450 may be provided. In one embodiment, a row data buffer 450 may be provided for each bank, and the memory controller may provide a bank address (for example, a buffer number) for addressing the row data buffer 450. In another embodiment, two or more row data buffers 450 may be provided for each bank, and each row data buffer 450 may be addressed by a bank address or a part of the bank address.

The data I/O unit 460 outputs the data that are read by the sense amplifier 440 and stored in the row data buffer 450 to the memory controller. Further, the data I/O unit 460 transfers data that are input from the memory controller to the write driver 470.

The write driver 470 writes the data input from the data I/O unit 460 to the memory cell array 410. The write driver 470 may write the data, through a plurality of bit lines, to a plurality of memory cells connected to the word line selected by the row decoder 430

In some embodiment, as shown in FIG. 4, the memory 400 may further include an overlay window register 480 and a program buffer 490. The overlay window register 480 is used, for example, to return a status value indicating a write completion to the memory controller within a predetermined time and to control program operations through the program buffer 490. The program buffer 490 may store the data that are input through the data I/O unit 460, and the data stored in the program buffer 490 may be written to the memory cell array 410 through the overlay window register 480. The overlay window register 480 may include a control register for writing the data to a storing position of the program buffer 490.

Now, a memory controller according to an embodiment of the present invention is described.

Figure 5:
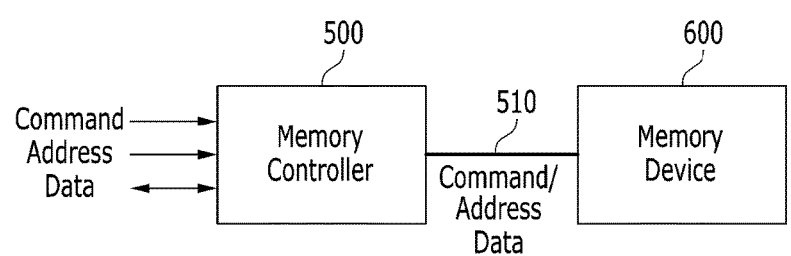
FIG. 5 and FIG. 6 each schematically show a memory controller according to an embodiment of the present invention.
Figure 6:
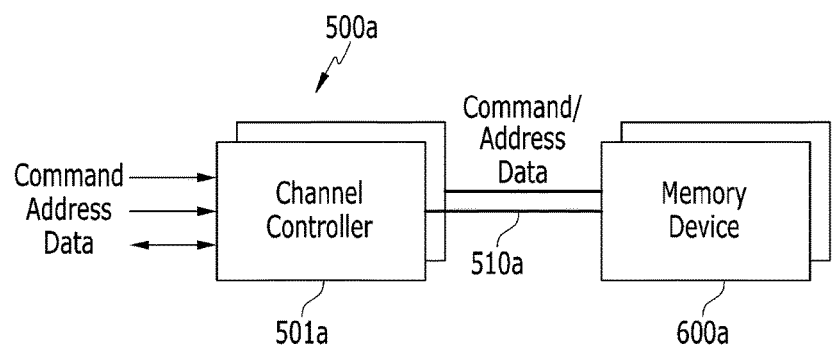

FIG. 5 and FIG. 6 each schematically show a memory controller according to an embodiment of the present invention.

Referring to FIG. 5, a memory controller 500 is connected to a central processing unit (CPU) and a memory device 600, and accesses the memory device 600 in response to a request from the CPU. For example, the memory controller 500 may control a read operation or a write operation of the memory device 600. In some embodiments, the memory device 600 may include a plurality of memory chips.

The memory controller 500 communicates with the CPU through a memory controller interface. The memory controller 500 may receive read/write commands and addresses from the CPU and exchange data with the CPU through the memory controller interface. In some embodiments, the memory controller interface may be a system bus. The system bus may be, for example, a front side bus (FSB), an advanced extensible interface (AXI), or an Avalon bus.

The memory controller 500 may communicate with the memory device 600 through a bus (or a channel) 510 to which the plurality of memory chips are commonly connected. The memory controller 500 may transfer the read/write commands and addresses to the memory device 600 and exchange the data through the channel 510.

Referring to FIG. 6, in some embodiments, a plurality of memory devices 600a each being connected to one or more channels among a plurality of channels 510a may be provided. In this case, a memory controller 500a may include a plurality of channel controllers 501a that are connected to the plurality of channels 510a respectively. Accordingly, a plurality of memory chips included in each memory device 600a may communicate with a corresponding channel controller 501a through a corresponding channel 510a.

Figure 7:
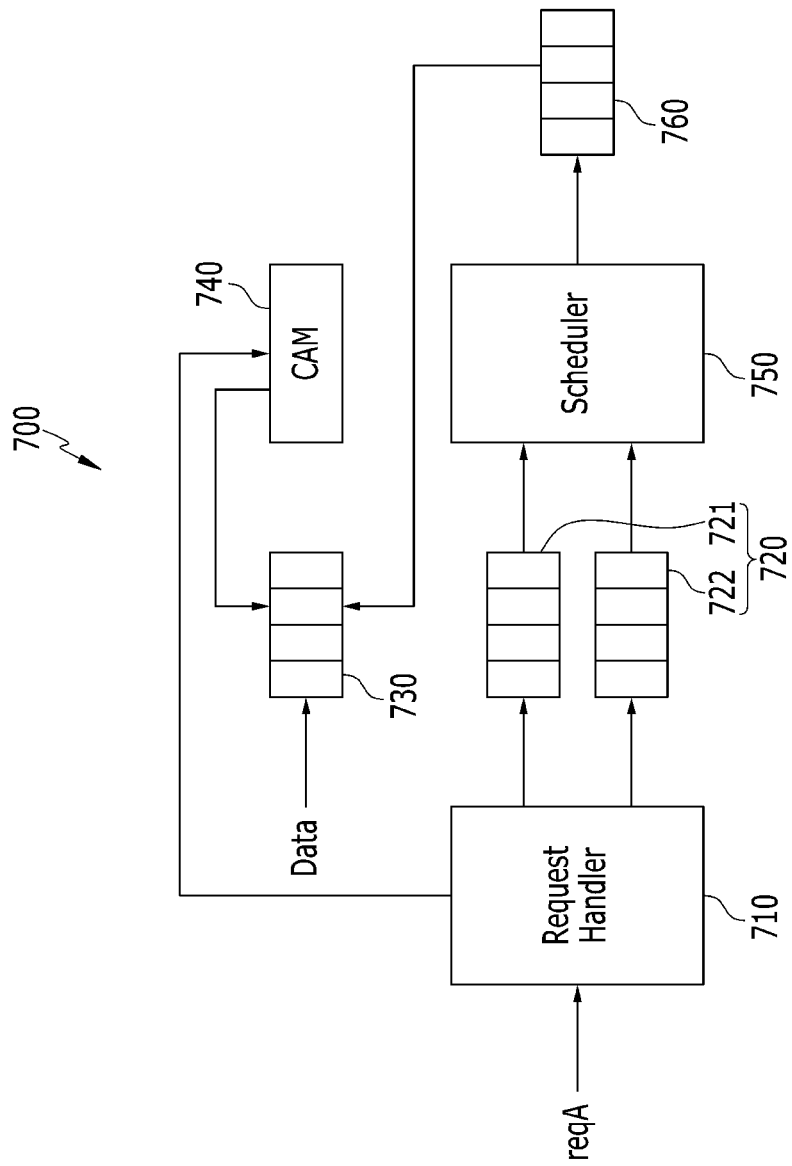
FIG. 7 is a schematic block diagram of a memory controller according to an embodiment of the present invention.

FIG. 7 is a schematic block diagram of a memory controller according to an embodiment of the present invention.

Referring to FIG. 7, a memory controller 700 includes a request handler 710, a request queue 720, a store buffer 730, a lookup memory 740, a scheduler 750, and an output command queue 760. As described with reference to FIG. 6, when a memory controller includes a plurality of channel controllers, the memory controller 700 shown in FIG. 7 may correspond to a channel controller. In the memory controller 700, the store buffer 730 may be implemented by a high-speed memory, for example a static random-access memory (SRAM). Some functions of the memory controller 700 may be implemented by a processor or a logic block, for example a field-programmable gate array (FPGA).

The request handler 710 groups requests reqA from a CPU into a burst

Here, the burst may mean a series of requests targeting a same row of a memory cell array. When a request arrives from the CPU, the request handler 710, if a burst targeting the same row as the arrived request exists in the request queue 720, adds the arrived request at the end of the burst in the request queue 720. When several bursts exist in the request queue 720, the arrived request may be inserted to the middle of the request queue 720. If no burst targeting the same row as the arrived request exists in the request queue 720, the request handler 710 adds the arrived request to the end of the request queue 720 in order to create a new burst.

In some embodiments, when the request handler 710 creates the new burst, an entry for the new burst may be allocated to the store buffer 730. When the request handler 710 adds a write request to the request queue 720, a data for the write request may be copied to the entry of the store buffer 730 which is allocated to the burst to which the write request belongs.

In some embodiments, the request queue 720 may include a read request queue 721 for read requests and a write request queue 722 for write requests, and the read requests and the write requests may separately managed on the read request queue 721 and the write request queue 722.

In some embodiments, the request queue 720 may implemented by linked list.

The store buffer 730 temporally stores data corresponding to the write request from the CPU. The write request added to the write request queue 722 may point data stored in the store buffer 730. In some embodiments, the store buffer 730 may store data by the predetermined size unit. The predetermined size unit may be, for example, the word unit or the cache line unit. In one embodiment, data of the predetermined size unit may be written to a memory device at the same time.

While the memory controller 700 is writing data stored in the store buffer 730 to a memory device or before a cooling time has not elapsed after writing the data into the memory device, a read on the corresponding data may be requested. In this case, the request handler 710 may read the data stored in the store buffer 730. Accordingly, the memory controller 700 can hide the cooling time from the CPU.

The lookup memory 740 stores information such as memory addresses of the data stored in the store buffer 730 such that the data stored in the store buffer 730 can be read. Therefore, when a read request on the data stored in the store buffer arrives, the memory controller 700 can access and read the data stored in the store buffer by using the lookup memory 740. In some embodiments, the lookup memory may be a content-addressable memory (CAM).

The scheduler 750 handles read requests and write requests in the request queue 720 and returns completions on the read requests and write requests. In some embodiments, since a write operation is slower than a read operation, the scheduler 750 may prioritize the write requests over the read requests.

One or more command sequence for writing data to the memory device or for reading data from the memory device are added to the output command queue 760. The command for write added to the output command queue 760 may point an address of write data stored in the store buffer 730.

According to an embodiment of the present invention, in response to a read request from the CPU, the memory controller may return a response indicating a completion of a read and read data after a predetermined read time has elapsed. In some embodiments, the predetermined read time may be set to a time tREAD necessary for the read in the memory cell as shown in FIG. 2.

In response to a write request from the CPU, the memory controller may return a response indicating a completion of a write after storing write data in the store buffer 730.

Therefore, a write time experienced by the CPU can be reduced. However, when the store buffer 730 becomes full by the fixed size of the store buffer 730, the CPU may experience an actual write time in the memory device as it is. Accordingly, the memory controller may return a response indicating the completion of the write after a predetermined write time has elapsed. In some embodiments, the predetermined write time may be set to a time that is shorter than a write latency time tWRT described above.

In one embodiment, the predetermined write time may be set to a time excluding a time tCOOL necessary for the cooling from the write latency time tWRT. Then, because the memory controller can return the response to the write request without waiting for additional time necessary for the cooling, the write time experienced by the CPU can be reduced.

In another embodiment, the predetermined write time may be set to a time excluding a time tCHG necessary for the charge pumping from the write latency time tWRT. Then, because the memory controller can return the response to the write request without waiting for additional time necessary for the charge pumping, the write time experienced by the CPU can be reduced. In this case, because the memory controller cannot perform a next write operation although it has returned the completion on the write request, the memory controller may process read requests until the next write operation becomes processible after the return.

In yet another embodiment, the predetermined write time may be set to a time excluding both the time tCOOL necessary for the cooling and the time tCHG necessary for the charge pumping from the write latency time tWRT. Then, because the memory controller can return the response to the write request without waiting for additional time necessary for the cooling and the charge pumping, the write time experienced by the CPU can be reduced.

Figure 8:
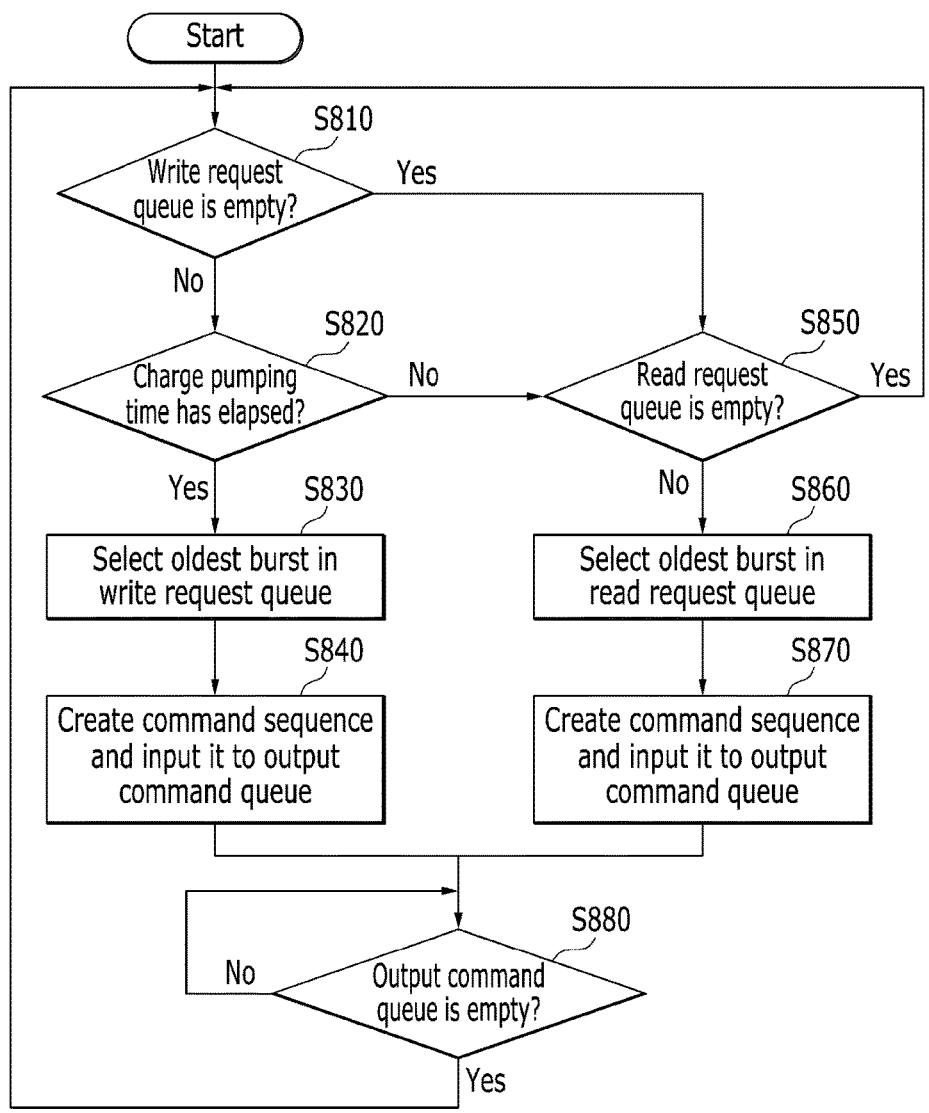
FIG. 8 is a flowchart showing a request scheduling method in a memory controller according to an embodiment of the present invention.

FIG. 8 is a flowchart showing a request scheduling method in a memory controller according to an embodiment of the present invention.

Referring to FIG. 8, a scheduler 750 first checks whether a write request queue 722 is empty (S810). If the write request queue 722 is not empty (S810: no), the scheduler 750 checks whether a predetermined latency time has elapsed from a previous write operation (S820). In some embodiment, the predetermined latency time may be determined by a time necessary for performing a write operation again after the previous write operation in a memory device. In one embodiment, the predetermined latency time may be determined based on a time tCHG necessary for charge pumping for the write operation.

If the predetermined latency time has elapsed (S820: yes), the scheduler 750 selects a request corresponding to the oldest burst from the write request queue 722 (S830). The scheduler 750 then creates a command sequence for writing the selected burst to the memory device and adds the created command sequence into an output command queue 760 (S840). The command sequence added to the output command queue 760 may be issued to the memory device such that the write operation can be performed in the memory device.

Since the memory device can perform a read operation while the charge pumping for the write operation is being performed, the scheduler 750 checks whether a read request queue 721 is empty (S850) if the predetermined latency time has not elapsed (S820: no). Further, the scheduler 750 checks whether a read request queue 721 is empty (S850) when the write request queue 722 is empty in the step S810.

If the read request queue 721 is not empty (S850: no), the scheduler 750 selects a request corresponding to the oldest burst from the read request queue 721 (S860). The scheduler 750 then creates a command sequence for reading the selected burst from the memory device and adds the created command sequence to the output command queue 760 (S870). The command sequence added to the output command queue 760 may be issued to the memory device such that the memory device can perform the read operation.

After adding the created command sequence to the output command queue 760, the scheduler 750 checks whether the output command queue 760 is empty (S880). If the output command queue 760 is empty (S880: yet), the scheduler 750 repeats the aforementioned processes S810-S870 to create a new command sequence. In one embodiment, the scheduler 750 may check whether the output command queue 760 is truly empty in the step S880. In another embodiment, the scheduler 750 may check whether the output command queue 760 is empty above a predetermined level.

When both the read request queue 721 and the write request queue 722 are empty (S810 and S850: yes), the scheduler 750 checks again whether the write request queue 722 or the read request queue 721 is empty (S810).

As described above, according to an embodiment of the present invention, the completion on the write request can be returned before the write latency time has elapsed. Accordingly, a write latency time experienced by the CPU can be reduced. When a read request exists before the write operation is completed, for example during a charge pumping time, the read request can be first processed.

Figure 9:
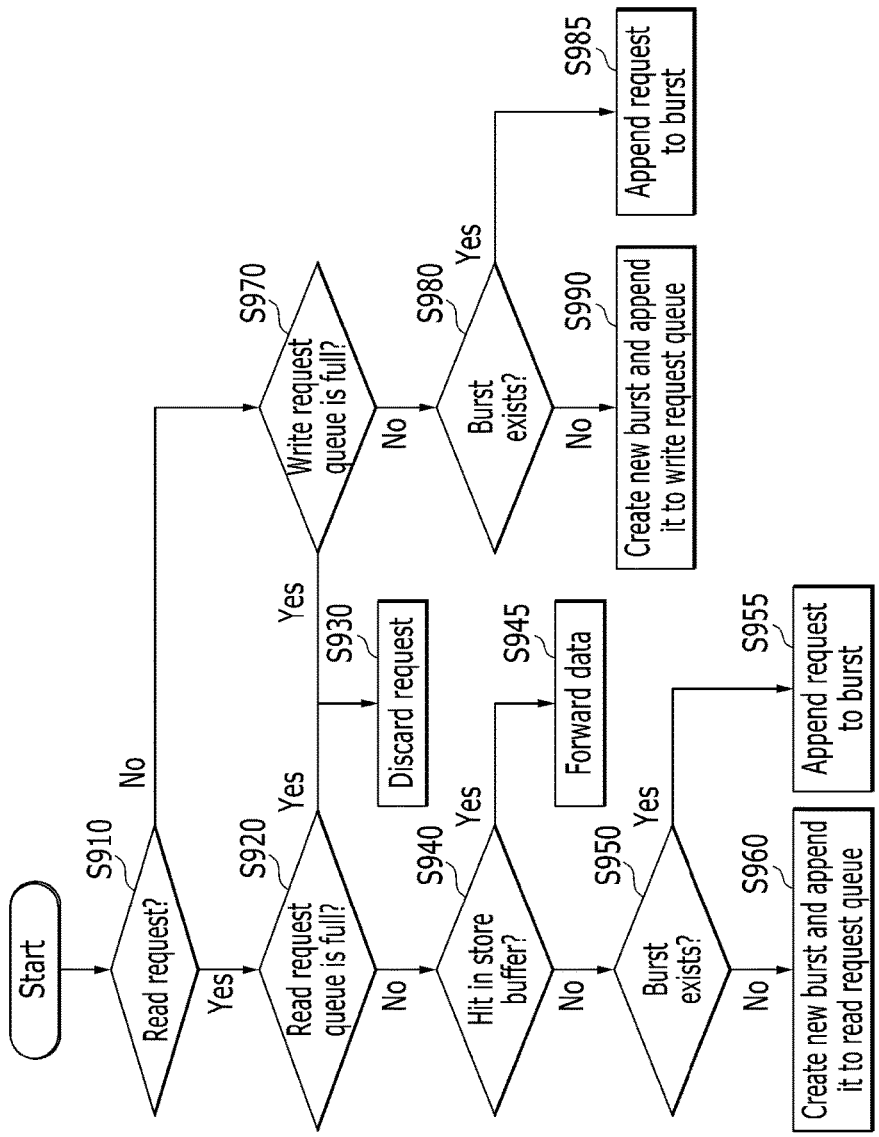
FIG. 9 is a flowchart of a request processing method in a memory controller according to an embodiment of the present invention.

FIG. 9 is a flowchart of a request processing method in a memory controller according to an embodiment of the present invention.

Referring to FIG. 9, a request handler 710, upon receiving a request reqA from a CPU, determines whether the request reqA is a read request or a write request (S910). If the request reqA is the read request (S910: yes), the request handler 710 checks whether a read request queue 721 is full (S920). If the read request queue 721 is full (S920: yes), the request handler 710 discards the request reqA and issues a failure response on the request reqA to the CPU (S930).

If the read request queue 721 is not full (S920: no), the request handler 710 determines whether the read request hits an entry in the store buffer 730 by referring to a lookup memory 740 (S940). That is, the request handler 710 determines whether target data of the read request are stored in the store buffer 730. If the read request hits an entry in the store buffer 730 (S940: yes), the request handler 710 forwards data stored in the store buffer 730 to the CPU and issues a response to the request reqA (S945).

If the read request does not hit entries in the store buffer 730 (S940: no), the request handler 710 checks whether a burst corresponding to the read request exists in the read request queue 721 (S950). If the burst corresponding to the read request exists in the read request queue 721 (S950: yes), the request handler 710 adds the request reqA to the burst (S955). If the burst corresponding to read request does not exist in the read request queue 721 (S950: no), the request handler 710 creates a new burst including the request reqA and adds the new burst to the read request queue 721 (S960).

If the request reqA is the write request (S910: no), the request handler 710 checks whether the write request queue 722 is full S970. If the write request queue 722 is full (S970: yes), the request handler 710 discards the request reqA and issues a failure response to the request reqA to the CPU (S930).

If the write request queue 722 is not full (S970: no), the request handler 710 checks whether a burst corresponding to the write request exists in the write request queue 722 (S980). If the burst corresponding to the write request exists in the write request queue 722 (S980: yes), the request handler 710 adds the request reqA to the burst and issues a response to the request reqA to the CPU (S985). If the burst corresponding to the write request does not exist in the write request queue 722 (S980: no), the request handler 710 creates a new burst in the write request queue 721, adds the request reqA to the created burst, stores the data in the store buffer, and issues a response to the request reqA to the CPU (S990).

Accordingly, when there are read requests while data are being written to memory cells or during the cooling time or charge pumping time after the data have been written to the memory cell, the memory controller 700 can read data from the store buffer 730 and forward the data even if the cooling time has not elapsed. Further, because the requests are handled by the burst, data of the same burst can be simultaneously processed at the read or write. Accordingly, the power consumption and time according to frequent memory accesses can be reduced.

Figure 10:
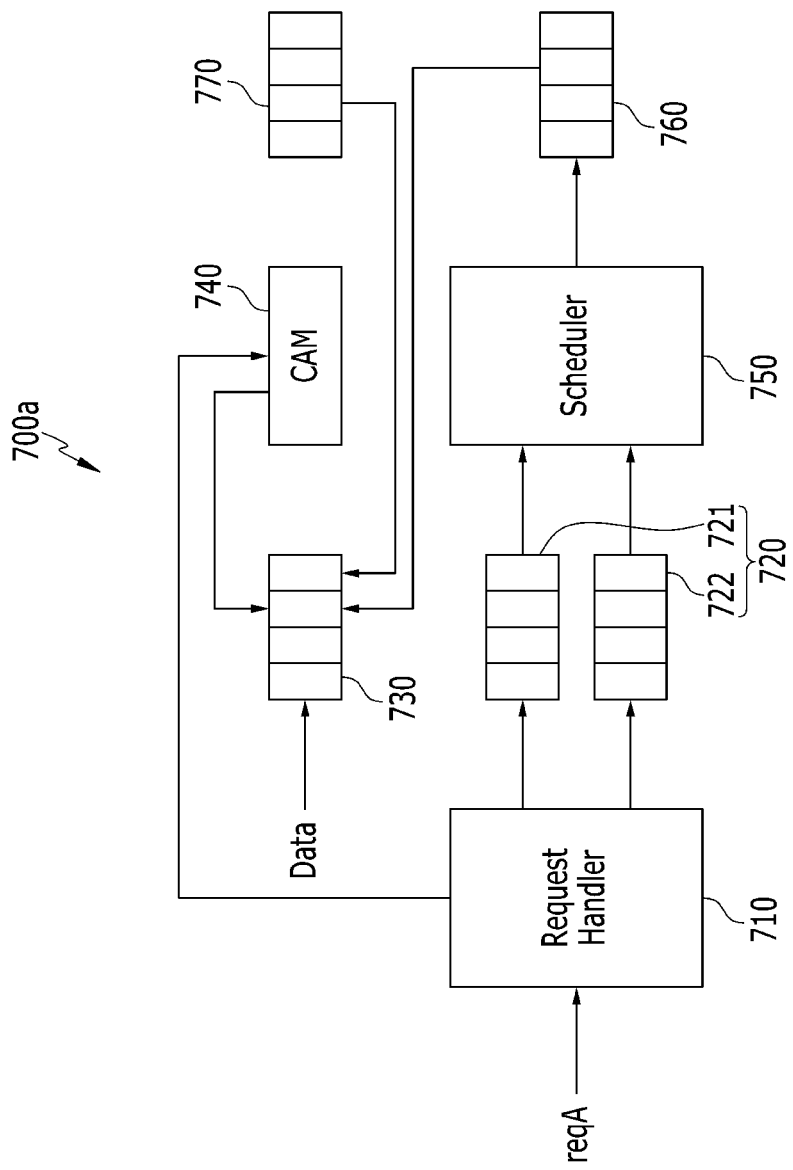
FIG. 10 is a schematic block diagram of a memory controller according to another embodiment of the present invention.

FIG. 10 is a schematic block diagram of a memory controller according to another embodiment of the present invention.

Referring to FIG. 10, a memory controller 700a according to another embodiment further includes an expiration queue 770.

The expiration queue 770 is used for evicting, from a store buffer 730, data whose cooling time has been expired since it is written to the memory device. In some embodiment, the expiration queue 770 may be implemented by a circular buffer or a linked list. When the expiration queue 770 is implemented by the circular buffer, two pointers, head and tail pointers, may move on the expiration queue 770 in one direction. The head pointer points an entry in the store buffer to which new data will be inserted. The tail pointer points an entry in the store buffer where the data pointed by the entry will be evicted. In some embodiment, the expiration queue may be implemented by only a head pointer. In this case, the head pointer serves also as a tail pointer. In other words, new data may be inserted at the entry pointed by the head pointer after evicting the data pointed by the entry from the store buffer. In some embodiments, since the store buffer 730 stores data for both write requests added to the write request queue 722 and write requests added to the expiration queue 770, the number of entries in the store buffer 730 may correspond to the sum of the size of the write request queue 722 and the size of the expiration queue 770.

In some embodiments, each entry of the expiration queue 770 may include a tag, a valid flag, and a buffer index. The tag indicates a target memory address of the write request in the memory device, and the buffer index indicates an address in which data corresponding to the write request are stored in the store buffer 730. The valid flag has a status value indicating whether the entry in expiration queue 730 is valid.

In one embodiment, when the write request is completed and a new write request is inserted in the expiration queue, a scheduler 750 may evict the oldest data among stored data in order to create a new space in the store buffer 730. For example, the write request may be completed when new data are stored in store buffer 730 and are written to the memory device in accordance with a write request.

In another embodiment, if no write request is arrived until the timer is expired, the scheduler 750 may forcedly move a head pointer along with evicting the oldest data from the store buffer 730. For example, the timer may be expired when a predetermined time has elapsed. In some embodiments, the predetermined time may be set to a program time, particularly a minimum program time. In some embodiments, the timer may be disabled while a write queue is not empty (i.e., the write request queue 722 contains a write request). Then, a time gap between two consecutive entries is guaranteed to be greater than or equal to the minimum program time.

In some embodiments, the number of entries of the expiration queue 770 may be set to a value for allowing the cooling time for data of an entry to elapse when the head pointer wraps around the circular buffer. In this case, since the header pointer indicates the entry whose cooling time has elapsed, another pointer for the tail may be omitted.

An operation for evicting data indicated by the head pointer from the store buffer 730 is described with reference to FIG. 11 and FIG. 12.

Figure 11:
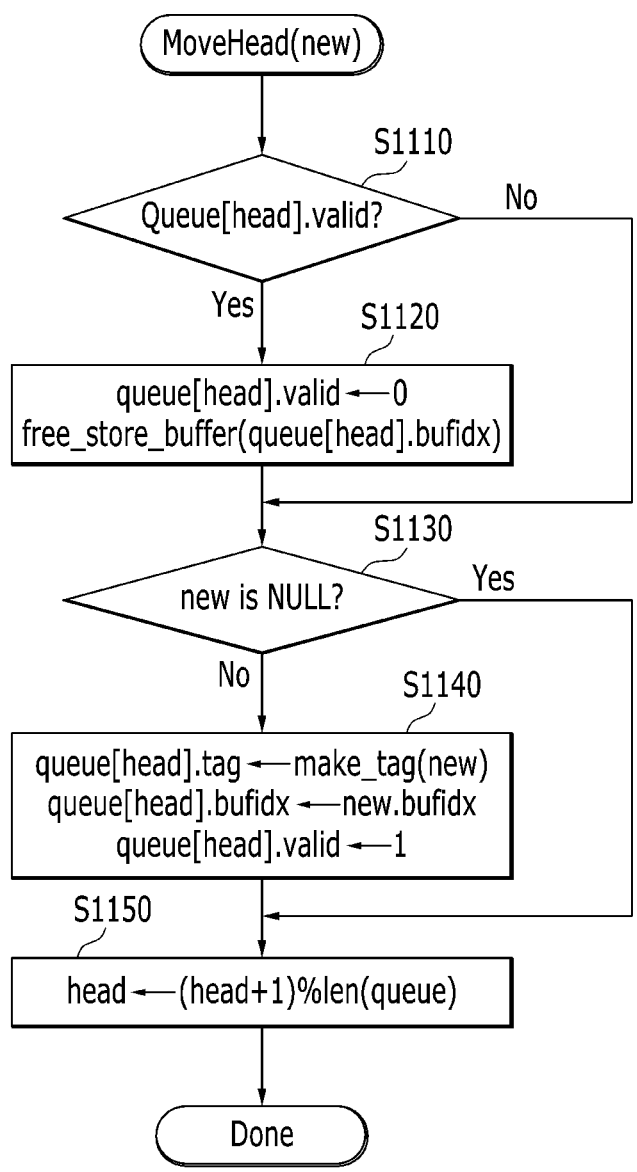
FIG. 11 is a flowchart of an expiration queue processing method in a memory controller according to an embodiment of the present invention.
Figure 12:
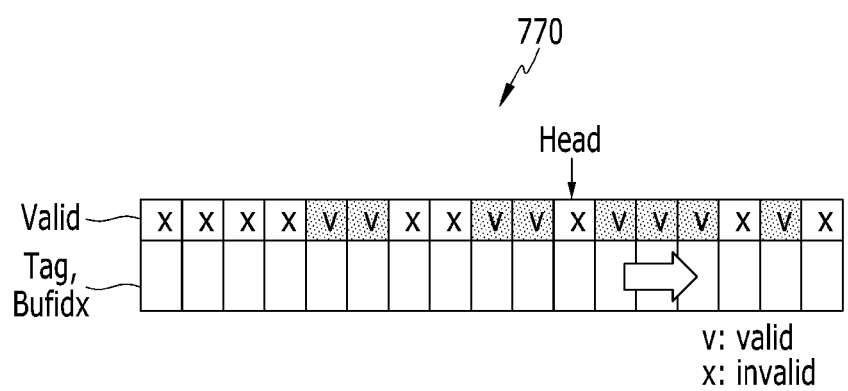
FIG. 12 schematically shows an expiration queue in a memory controller according to an embodiment of the present invention.

FIG. 11 is a flowchart of an expiration queue processing method in a memory controller according to an embodiment of the present invention, and FIG. 12 schematically shows an expiration queue in a memory controller according to an embodiment of the present invention.

In some embodiments, operations shown in FIG. 11 may be performed by a predetermined function. It is assumed in FIG. 11 that the predetermined function is "MoveHead(new)." When a new write request is inserted, an input (new) of the function (MoveHead(new)) may be either a new entry according to the new write request. When a timer is expired, the input (new) may be null.

Referring to FIG. 11, a scheduler 750 checks a valid field (queue[head].valid) of an entry of an expiration queue 770 indicated by a head pointer (S1110). If the valid field (queue[head].valid) of the head entry is valid (that is, if data are stored in an address of the store buffer 730 corresponding to a buffer index (queue[head].bufidx) of the head entry) (S1110: yes), the scheduler 750 changes the value of the valid field (queue[head].valid) to an invalid value, for example "0" and evicts data stored in the address of the store buffer 730 (S1120). A function for evicting data is exemplified as "free_store_buffer(queue[head].bufidx)" in FIG. 11.

After evicting the data of the store buffer 730 (S1120) or if the valid field (queue[head].valid) of the head entry is not valid (S1110: no), the scheduler 750 checks whether a new entry is inserted to the expiration queue 770 or whether a predetermined time has elapsed (S1130).

When the new entry is inserted, for example when the input (new) of the function (MoveHead(new)) is not null (S1130: no), the scheduler 750 sets a tag (queue[head].tag) of the head entry (queue[head]) to an address (make_tag (new)) of the memory device to which the new data are written (S1140). Further, the scheduler 750 sets the buffer index (queue[head].bufidx) of the head entry (queue[head]) to a buffer index (new.bufidx) of the store buffer 730 in which the new data are stored, and sets the valid field (queue[head].valid) to a valid value, for example "1" (S1140).

The scheduler 750 then moves the head pointer to the next entry which might contain information about the oldest data in the store buffer 730 (S1150). For example, the scheduler 750 may move the head pointer by one entry as shown in FIG. 12. That is, the scheduler 750 may set the head pointer to "(head+1)% len(queue)."

Here, "len(queue)" corresponds to a length of the expiration queue 770.

When the new entry is not inserted and the timer is expired (S1130: yes), the scheduler 750 may move the head pointer by one entry (S1150).

As described above, according to an embodiment of the present invention, the oldest data can be evicted from the store buffer 730 when the new data are input.

In some embodiments, data of the store buffer 730 may be maintained during the cooling time or the charge pumping time after the data are written to the memory device. Therefore, the number of entries in the expiration queue 770 may be set to manage the data in the store buffer 730 during the cooling time or the charge pumping time. In a case that there are differences in cooling times of memory cells included in the memory device, in one embodiment, the cooling time for setting the number of entries of the expiration queue 770 may be set to the worst case cooling time of the memory device, max(cooling_time).

Further, since new entries are inserted to the expiration queue 770 when a program time has elapsed, the number of entries of the expiration queue 770 may be set to the maximum number of times the program can be performed during the cooling time. For example, the number of entries of the expiration queue 770 may be set to the worst case max(cooling_time)) of the cooling time divided by a minimum program time, as in Equation 2. On the other hand, the size (PGM_PAGE_SIZE) of data unit (for example, a page) that can be programmed at the same time may be equal to or greater than the unit size (BUFFER_SIZE) of the store buffer 730. If the page size (PGM_PAGE_SIZE) is greater than the unit size (BUFFER_SIZE) of the store buffer, the number of entries to be inserted when the program is performed once is PGM_PAGE_SIZE/BUFFER_SIZE. Accordingly, the number of entries of the expiration queue 770 may be set as in Equation 3. In some embodiment, even if the size of actual programmed data is less than the PGM_PAGE_SIZE, still PGM_PAGE_SIZE/BUFFER_SIZE entries may be inserted to the expiration queue 770. In this case, the valid flags of entries that do not contain information about the programmed data in the store buffer may have the false value (for example, "0").

$$\# \text{ of entries} = \frac{\max(\text{cooling\_time})}{\min(\text{program\_time})} \qquad \text{Equation 2}$$

$$\# \text{ of entries} = \frac{\max(\text{cooling\_time})}{\min(\text{program\_time})} \cdot \frac{\text{PGM\_PAGE\_SIZE}}{\text{BUFFER\_SIZE}} \qquad \text{Equation 3}$$

Figure 13:
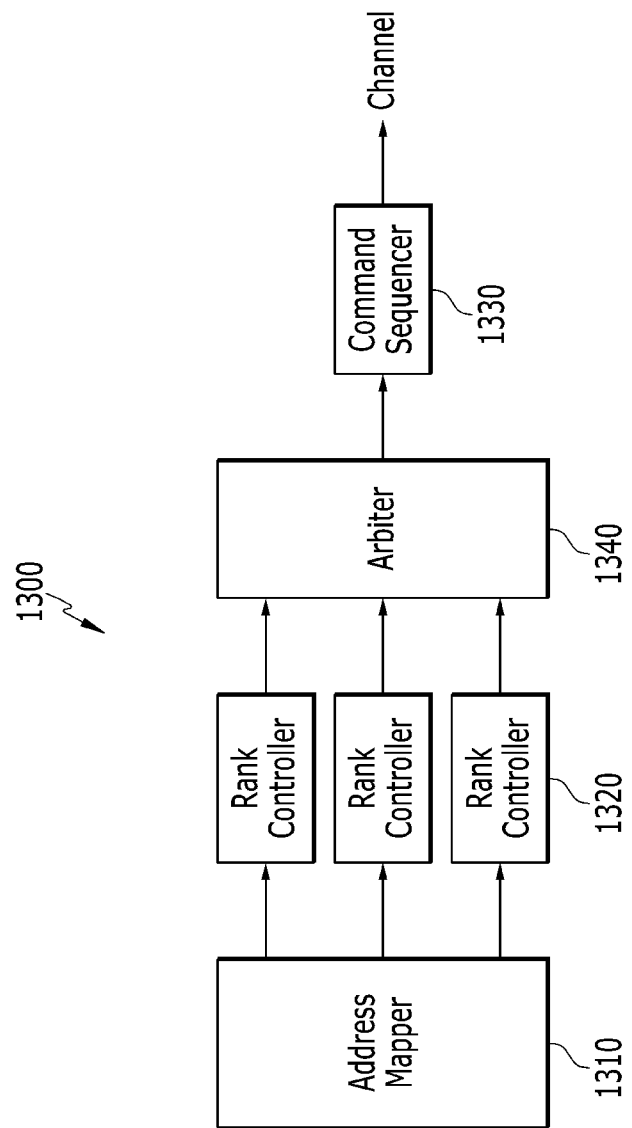
FIG. 13 is a schematic block diagram of a memory controller according to yet another embodiment of the present invention.

FIG. 13 is a schematic block diagram of a memory controller according to yet another embodiment of the present invention.

Referring to FIG. 13, a memory controller 1300 includes an address mapper 1310, a plurality of rank controllers 1320, an arbiter 1330, and a command sequencer 1340.

A memory device may include a plurality of ranks. In some embodiments, the rank may be a set of memory chips that are independently accessible through a shared channel.

The plurality of ranks may operate independently and may share a channel for commands, addresses, and data. In this case, the memory controller 1300 may include the plurality of rank controllers 1320 that correspond to the plurality of ranks respectively. Each rank controller 1320 may be implemented like the memory controller described with reference to FIG. 5 to FIG. 12.

The address mapper 1310 maps a command (a write request or a read request), an address, and data from the CPU to a rank controller 1320 corresponding to a rank matched to the address from among the plurality of ranks.

The arbiter 1330 arbitrates accesses to the channel referring to a channel status. The arbiter may adjust timings for commands from the plurality of rank controllers 1320. In some embodiments, the arbiter 1330 may consider a row address to column address delay, a charge pumping time, or a column address strobe (CAS) latency time.

In some embodiments, the arbiter 1330 may use a round robin method or a priority-based method as a policy for arbitrating the accesses to the channel.

In some embodiments, a memory controller may be a separate chip (or controller) or be integrated into another chip (or controller). For example, the memory controller may be integrated into a northbridge that manages communications between a CPU and other parts of a motherboard such as a memory device.

Figure 14:
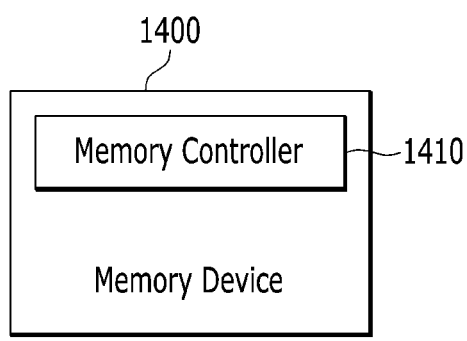
FIG. 14 schematically shows a memory module including a memory controller according to an embodiment of the present invention.

In some embodiments, a memory controller 1410 may be integrated into a memory module 1400 along with a memory device 1420 as shown in FIG. 14. In some embodiments, the memory module 1400 may be a memory module into which a plurality of memory chips are integrated. In one embodiment, the memory module may be a DIMM (dual in-line memory module).

Figure 15:
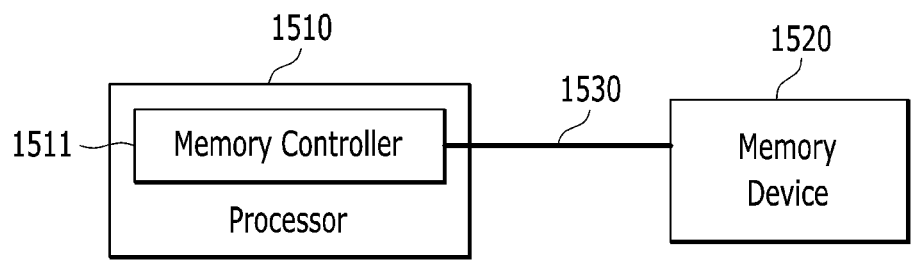
FIG. 15 schematically shows a processor including a memory controller according to an embodiment of the present invention.

In some embodiments, a memory controller 1511 may be integrated into a processor 1510 such as a CPU as shown in FIG. 15. In one embodiment, the memory controller 1511 may be connected to the processor 1510 via a system bus (not shown) and be connected to a memory device 1520 via a bus (channel) 1530.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A memory controller comprising:
   a request handler that handles a write request which is input from a central processing unit (CPU) and requests data write to a memory device using a memory in which a write latency time is longer than a read latency time, and a read request which is input from the CPU and requests a data read from the memory device;
   a write request queue that stores the write request;
   a read request queue that stores the read request; and
   a scheduler that returns a completion on the write request to the CPU when a predetermined write time has elapsed, the predetermined write time being shorter than the write latency time that is taken to complete the data write to a memory cell of the memory device in response to the write request,
   wherein the scheduler creates a command to be issued to the memory device based on a request stored in the write request queue when a predetermined latency time has elapsed from a previous write operation in the memory device, and
   wherein the scheduler creates a command to be issued to the memory device based on a request stored in the read request queue when the predetermined latency time has not elapsed.

2. The memory controller of claim 1, further comprising a store buffer that temporally stores write data corresponding to the write request when the write data are written to the memory device, wherein the request handler, in response to the read request from the CPU, reads read data corresponding to the read request from the store buffer when the read data are stored in the store buffer.

3. The memory controller of claim 2, further comprising a lookup memory that stores an address of data stored in the store buffer.

4. The memory controller of claim 2, wherein the store buffer evicts the write data after a predetermined time has elapsed.

5. The memory controller of claim 2, wherein the store buffer evicts an oldest data when a new write request is inserted.

6. The memory controller of claim 5, further comprising an expiration queue that includes a plurality of first entries corresponding to a plurality of second entries of the store buffer respectively and moves a pointer when the write request is inserted, wherein the store buffer evicts data of a second entry corresponding to a first entry indicated by the pointer from among the second entries.

7. The memory controller of claim 6, wherein the expiration queue further moves the pointer when a predetermined time is expired.

8. The memory controller of claim 1, wherein the request handler, when a burst corresponding to the write request exists in the write request queue, adds the write request to the burst, and when no burst corresponding to the write request exists in the write request queue, adds a new burst including the write request to the write request queue.

9. The memory controller of claim 8, wherein the request handler, when a burst corresponding to the read request exists in the read request queue, adds the read request to the burst, and when no burst corresponding to the read request exists in the read request queue, adds a new burst including the read request to the read request queue.

10. The memory controller of claim 1, wherein the predetermined latency time is determined based on a time necessary for performing a write operation again in the memory device after the previous write operation.

11. The memory controller of claim 1, wherein the predetermined latency time is determined based on a time necessary for charge pumping for a write operation in the memory device.

12. The memory controller of claim 1, wherein the predetermined latency time is determined based on a time necessary for cooling in the memory device.

13. A memory module comprising:
a memory controller according to claim 1; and
the memory device.

14. A processor comprising a memory controller according to claim 1, wherein the memory controller is connected to the memory device through a system bus.

15. A memory module comprising:
a memory device using a memory in which a write latency time is longer than a read latency time; and
a memory controller,
wherein the memory controller comprises:
a write request queue to which a write request, which requests a data write to the memory device, from a central processing unit (CPU) is inserted;
a read request queue to which a read request, which requests a data read from the memory device, from the CPU is inserted; and
a scheduler that creates a command to be issued to the memory device based on a request stored in the write request queue when a predetermined condition including a first condition that the write request queue is not empty and a second condition that a predetermined latency time has elapsed from a previous write operation in the memory device is satisfied, and creates a command to be issued to the memory device based on a request stored in the read request queue when the first condition or the second condition is not satisfied.

16. The memory module of claim 15, wherein the predetermined latency time is determined based on a time necessary for performing a write operation again in the memory device after the previous write operation.

* * * * *